US006202547B1

United States Patent
Tseng et al.

(10) Patent No.: US 6,202,547 B1
(45) Date of Patent: Mar. 20, 2001

(54) JUICER HAVING TWO CUTTERS

(76) Inventors: Rong-Yuan Tseng, 10F, No. 3, Lane 65, Sec. 2, Chung Hsiao Rd.; Kuo-I Ling, 9F, No. 12, Alley 31, Lane 105, Sec. 2, Chung Hsiao Rd., both of San Chorng City, Taipei Hsien (TW)

( * ) Notice: Subject to any disclaimer, the term of this patent is extended or adjusted under 35 U.S.C. 154(b) by 0 days.

(21) Appl. No.: 09/645,516

(22) Filed: Aug. 25, 2000

(51) Int. Cl.$^7$ .............................. A23N 1/00; A23N 1/02
(52) U.S. Cl. ................................. 99/511; 99/513
(58) Field of Search ............................. 99/348, 484, 489, 99/492, 493, 495, 509–513; 210/360.1, 380.1, 369; 241/36, 37.5, 92.69, 282.1; 366/914, 601, 197, 199, 205; 494/36, 43, 56, 58; 426/51, 478, 481, 489, 495, 533, 615, 616, 643

(56) References Cited

U.S. PATENT DOCUMENTS

| 2,311,379 | * | 2/1943 | Gillanders | 99/512 |
| 2,845,971 | * | 8/1958 | Cordero | 99/512 |
| 3,892,365 | * | 7/1975 | Verdum | 241/282.1 X |
| 4,183,293 | * | 1/1980 | Arao et al. | 99/513 X |
| 4,345,517 | * | 8/1982 | Arao et al. | 99/511 |
| 4,506,601 | * | 3/1985 | Ramirez et al. | 99/511 |
| 4,614,153 | * | 9/1986 | Kurome et al. | 99/513 X |
| 4,681,031 | * | 7/1987 | Austad | 99/511 |
| 4,700,621 | * | 10/1987 | Elger | 99/513 X |
| 5,222,430 | * | 6/1993 | Wang | 99/511 X |
| 5,421,248 | * | 6/1995 | Hsu | 99/511 X |
| 5,433,144 | * | 7/1995 | Lee | 99/512 |
| 5,479,851 | * | 1/1996 | McClean et al. | 99/513 X |

\* cited by examiner

Primary Examiner—Timothy F. Simone
(74) Attorney, Agent, or Firm—Rosenberg, Klein & Lee

(57) ABSTRACT

A juicer having a stationary cutter and a rotary cutter is provided to fully grind fruit or vegetable fed into the juicer so that as much juice as possible is produced from the ground fruit or vegetable. The rotary cutter is mounted in a strainer basket and fixed onto a main shaft of an operating motor of the juicer so as to rotate along with the main shaft when the motor is started. The stationary cutter is fixedly connected to a lower end of a feed tube downward extended from a top cover of the juicer to closely locate above and face against the rotary cutter. The stationary and the rotary cutters are provided on lower and upper surfaces, respectively, with a plurality of cutter blades at an inner area and a grinding zone around an outer peripheral area. Any fruit or vegetable fed into the juicer via the feed tube is first ground between the two cutters by the cutter blades and any partially ground fruit or vegetable is then centrifugally moved to the peripheral grinding zones for further grinding to produce more juice before the resulting pulp is discharged from the juicer.

1 Claim, 4 Drawing Sheets

JUICER HAVING TWO CUTTERS

BACKGROUND OF THE INVENTION

FIG. 1 illustrates the general structure of a currently commercially available juicer A. As shown, the juicer A includes a base A1, an operating motor A2 mounted in the base A and having an externally threaded main shaft A3 upward projected therefrom, a working bowl A4, a strainer basket A5, and a rotary cutter A6 sequentially mounted on the top of the base A1 around the main shaft A3 o the motor A2, and a top cover A7 covering a top of the working bowl A4. Fruit or vegetable is fed into the juicer via a feed tube A8 provided on the top cover A7 and is slowly pushed downward with a plunger A9. The fruit or vegetable, when being exposed from a lower end of the feed tube A8, is ground by the rotary cutter A6 to produce juice and pulp. The pulp is thrown under a centrifugal force of the rotary cutter directly to a discharge outlet A1. Since there is only one cutter, the pulp is produced and centrifugally thrown out within a very short time after the fruit or vegetable is in contact with the rotary cutter A6, and therefore the pulp still contains considerably large amount of juice. This is, of course, an unnecessary waste of the fruit or vegetable.

It is therefore tried by the inventor to develop a juicer having two cutters to eliminate the drawbacks existing in the conventional juicer that has only one rotary cutter.

SUMMARY OF THE INVENTION

A primary object of the present invention is to provide a juicer having two cutters to fully grind the fruit or vegetable fed into the juicer to produce as much juice as possible.

To achieve the above and other objects, the juicer according to the present invention includes a rotary cutter mounted onto the main shaft of the operating motor of the juicer to rotate along with the main shaft of the motor, and a stationary cutter fixedly connected to a lower end of the feed tube downward extended from the top cover of the juicer to closely locate above and face against the rotary cutter. The stationary and the rotary cutters are provided on lower and upper surfaces, respectively, with a plurality of cutter blades at an inner area and a grinding zone around an outer peripheral area. Any fruit or vegetable fed into the juicer via the feed tube is first ground between the two cutters by the cutter blades and any partially ground fruit or vegetable is then centrifugally moved to the peripheral grinding zones for further grinding to produce more juice before the resulting pulp is discharged from the juicer.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
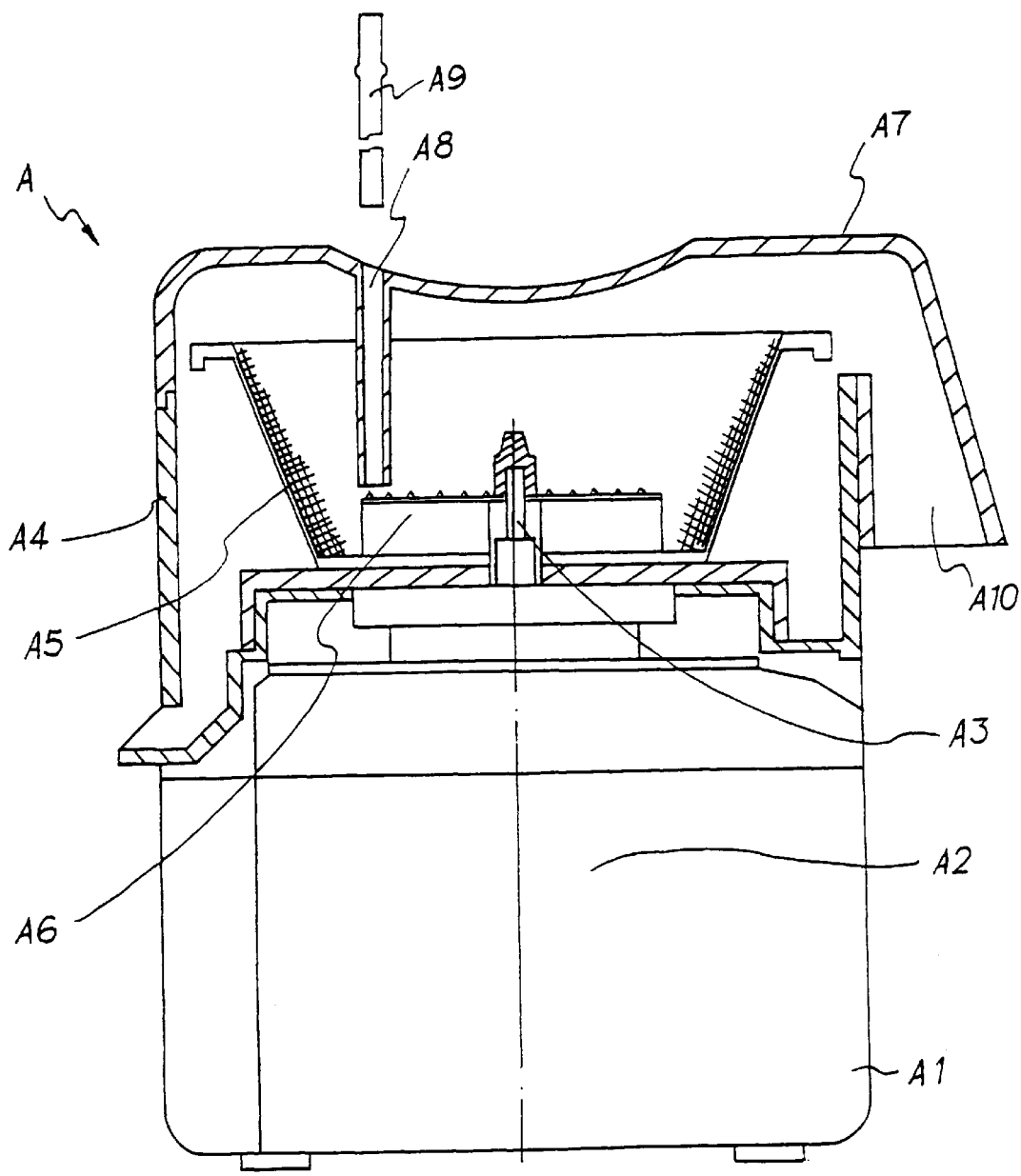
FIG. 1 is a partially sectional view of a conventional juicer having only one rotary cutter.
Figure 2:
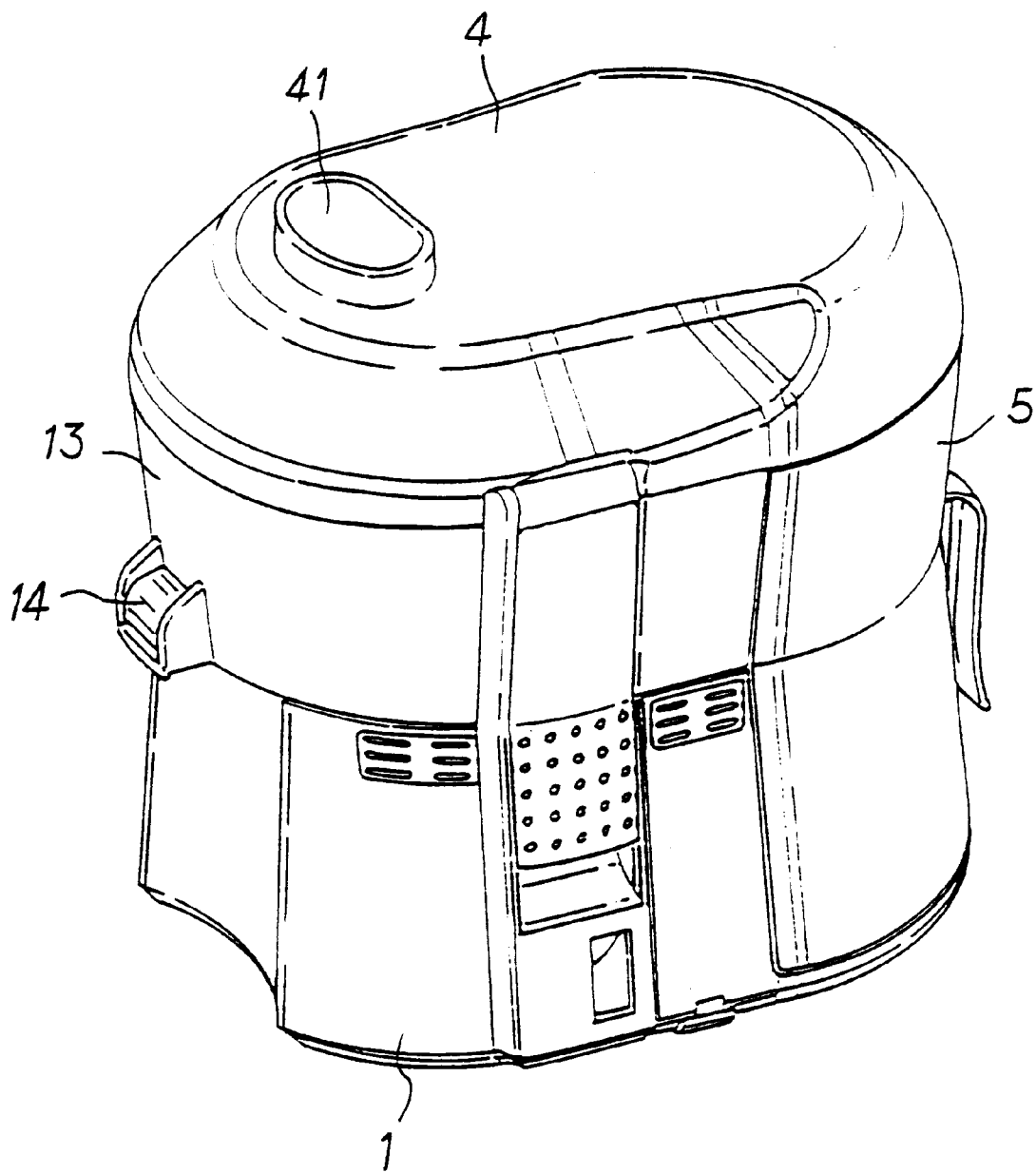
FIG. 2 is a perspective of a juicer having two cutters according to the present invention.
Figure 4:
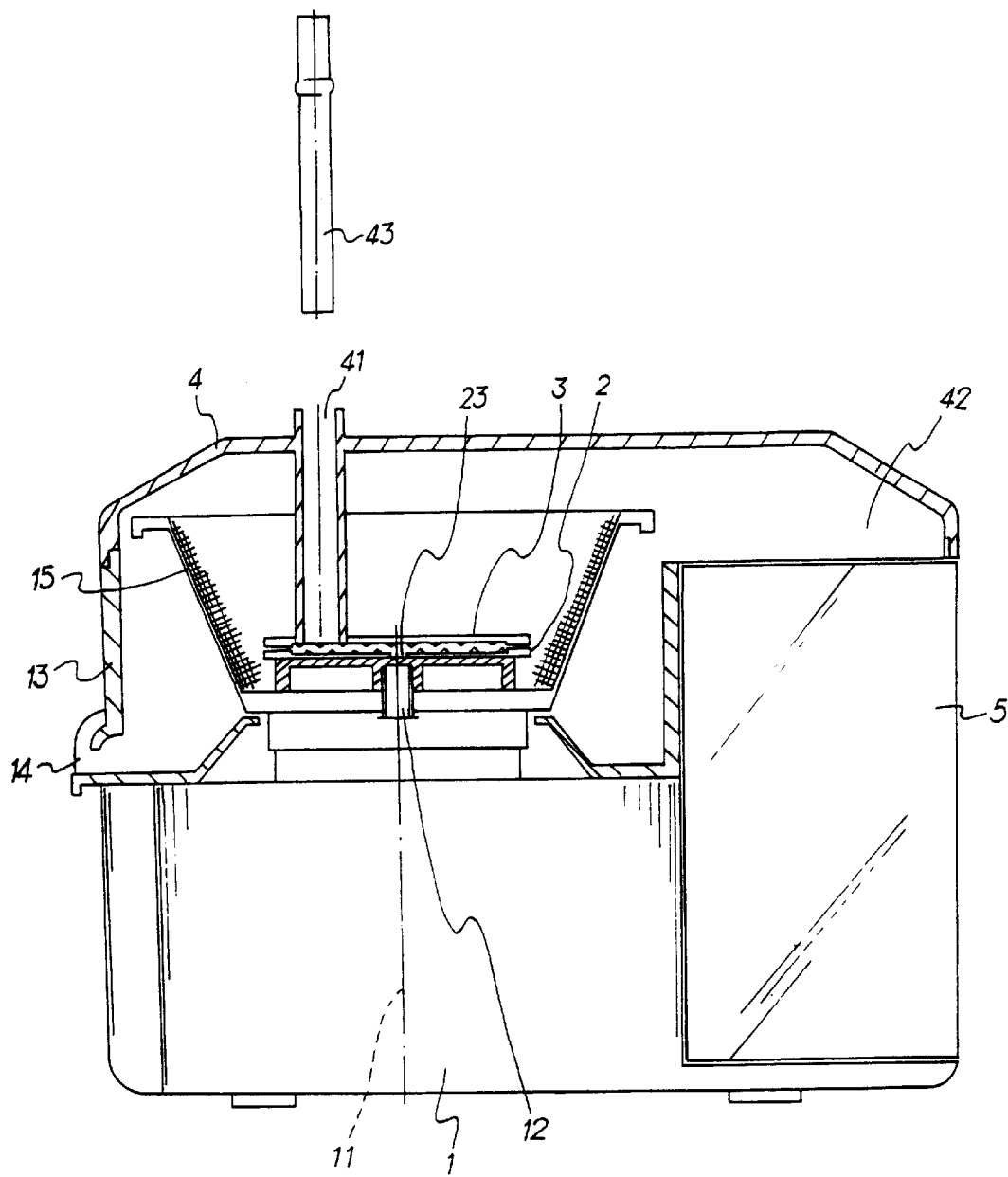
FIG. 4 is a partially sectional view of the juicer of FIG. 2 showing the positions of the rotary and the stationary cutters in the juicer.

Please refer to FIGS. 2 and 4 that are perspective and partially sectional views, respectively, of a juicer according to the present invention. As shown, the juicer mainly includes a base 1 in which an operating motor 11 having an upward extended and externally threaded main shaft 12 is mounted. A working bowl 13 is connected to a top of the base 1 and defines an inner receiving space. The working bowl 13 is formed at one side with a spout 14. A conic strainer basket 15 is positioned in the receiving space defined by the working bowl 13 and supported on a central top of the base 1 with the main shaft 12 of the operating motor 11 upward projected from a bottom center of the strainer basket 15. Since the structure and positions of these components 11, 12, 13, 14 and 15 are generally the same as that in the conventional juicer, they are not described in details herein.

Figure 3:
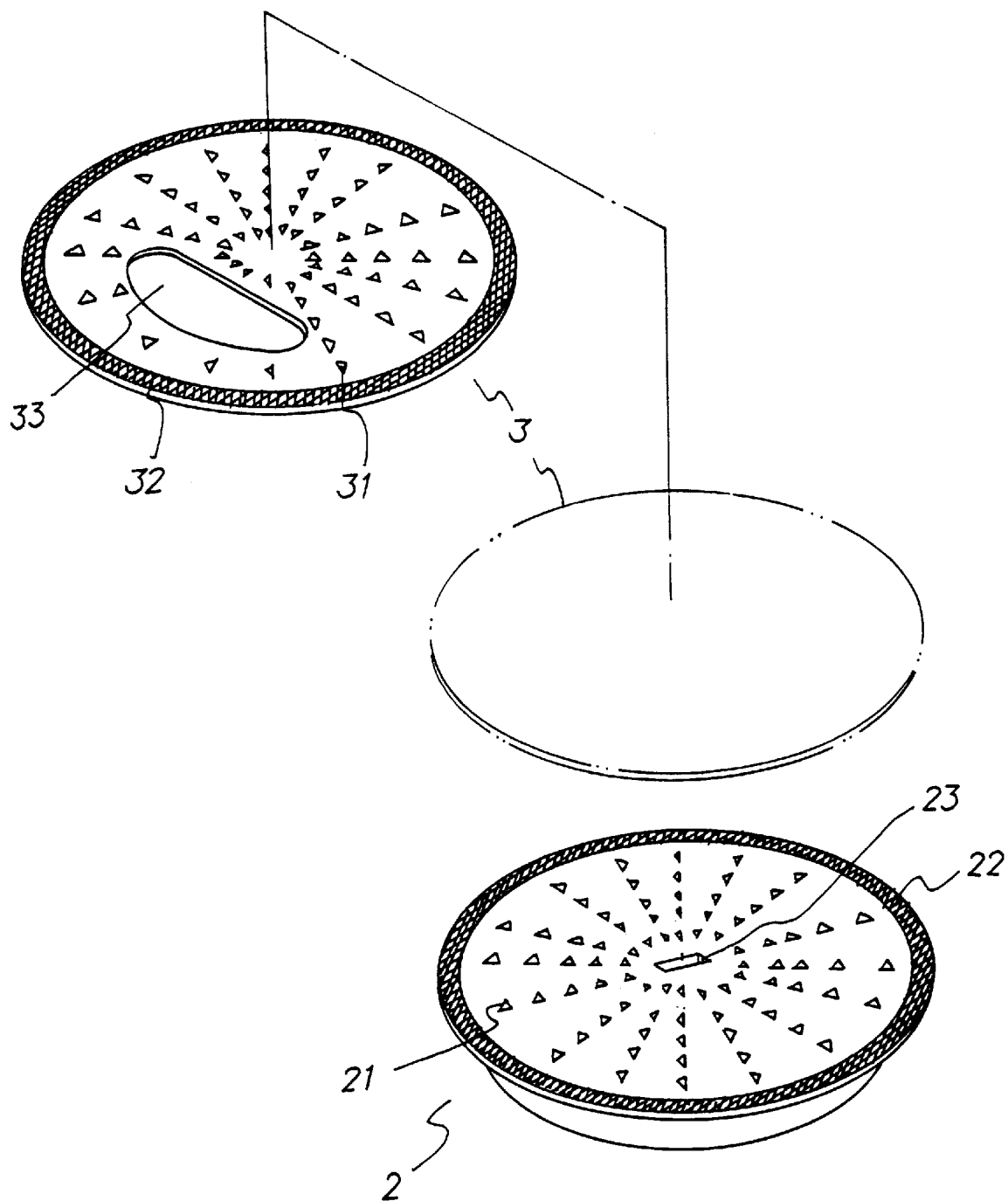
FIG. 3 is an exploded perspective showing a rotary and a stationary cutter for the juicer of the present invention.

Please refer to FIGS. 2, 3 and 4 at the same time. The juicer includes a rotary cutter 2 and a stationary cutter 3.

The rotary cutter 2 is a round member having a predetermined thickness and is adapted to locate in the conic strainer basket 15 above the main shaft 12. The rotary cutter 2 is formed at central potion with a recess 23 in which an axially extended threaded hole is provided, so that a fastening means (not shown) may be extended through the threaded hole in the recess 23 to fasten the rotary cutter 2 to the main shaft 12 and in and above the conic strainer basket 15. Thereby, the rotary cutter 2 rotates along with the main shaft 12 when the operating motor 11 is started. The rotary cutter 2 is provided on an upper surface at an inner area with a plurality of first cutter blades 21 and around an outer peripheral area with a first annular grinding zone 22 having a predetermined width.

The stationary cutter 3 is a round member having a smaller thickness compared with the rotary cutter 2. The stationary cutter 3 is formed of an eccentric connecting hole 33 corresponding to a feed tube 41 downward extended from a top cover 4 of the juicer, so that the stationary cutter 3 could be connected to a lower end of the feed tube 41. The stationary cutter 3 is provided on a lower surface at an inner area with a plurality of second cutter blades 31 and around an outer peripheral area with a second annular grinding zone 32 having a predetermined width.

The top cover 4 is located above and covers the working bowl 13 and a pulp cup 5 positioned on the base 1 to anther side of the working bowl 13. A feed tube 41 is formed with the top cover 4 to downward extend into the conic strainer basket 15 with the stationary cutter 3 fixedly connected to a lower end thereof.

After the rotary cutter 2 and the conic strainer basket 15 have been together fastened to the main shaft 12 within the working bowl 13, the operation of the operating motor 11 would bring the rotary cutter 2 to rotate with the main shaft 12. When the top cover 4 is closed onto the top of the base 1 to cover the working bowl 13 and the pulp cup 5, the rotary cutter 2 and the stationary cutter 3, and accordingly the first cutter blades 21 and the second cutter blades 31 as well as the first annular grinding zone 22 and the second annular grinding zone 32, face to each other with a predetermined clearance left between them.

An amount of fruit or vegetable is fed into the feed tube 41 and slowly pushed into the working bowl 13 with a plunger 43. When the operating motor 11 is started, the rotary cutter 2 is caused to rotate while the stationary cutter 3 keeps unmoved. At this point, fruit or vegetable downward fed via the feed tube 41 is pushed into the clearance between the rotary and the stationary cutters 2, 3 and preliminarily ground by the first and the second cutter blades 21, 31 to produce juice. Under a centrifugal force of the rotating rotary cutter 2, any ground fruit or vegetable would be moved to and further ground at and by the first and the second annular grinding zones 22, 32 to produce more juice. The produced juice is thrown by the centrifugal force from the conic strainer basket 15 into the working bowl 13 for flowing out from the spout 14, and any pulp of the ground fruit or vegetable is thrown by the centrifugal force out of the strainer basket 15 to a discharge outlet 42 provided between the top cover 4 and the working bowl 13. The pulp cup 5 is positioned immediately below the discharge outlet 42 to collect the discharged pulp.

As mentioned above, the conventional juicer A includes only one rotary cutter A6 that fails to fully grind the fruit or vegetable fed into the juicer A before the partially ground fruit or vegetable is centrifugally thrown out of the working bowl and discharged, so that only a small amount of juice is produced or extracted from the fruit or vegetable. On the contrary, the juicer of the present invention includes an additional stationary cutter 3 closely above the rotary cutter 2, and both the rotary and the stationary cutters 2, 3 are provided around their outer peripheral areas with grinding zones 22, 32. Any preliminarily ground fruit or vegetable between the rotary and the stationary cutters 2, 3 is centrifugally moved to the grinding zones 22, 32 for a second time grinding to produce more juice. Moreover, since the clearance between the grinding zones 22, 23 is small, the partially ground fruit or vegetable would be held between the two cutters 2, 3 before being fully ground at and by the grinding zones 22, 32. The grinding zones 22, 32 therefore ensure a complete grinding of the fruit or vegetable fed into the juicer to extract as much juice as possible. Therefore, the juicer of the present invention having two cutters is superior to the conventional juicer having only one rotary cutter.

What is claimed is:

1. A juicer having two cutters, comprising a base, an operating motor mounted in said base and having an externally threaded main shaft upward projected from a top of said base, a working bowl connected to the top of said base and defining an inner receiving space with a spout formed at one lower side thereof, a conic strainer basket positioned in the receiving space defined by said working bowl and supported on a central top of said base with said main shaft of said operating motor upward projected from a bottom center of said strainer basket, a pulp cup positioned on said base to another side of said working bowl, a top cover located above said working bowl for covering said working bowl and said pulp cup and having a feed tube downward extended into said conic strainer basket, a stationary cutter fixedly connected to a lower end of said feed tube of said top cover, and a rotary cutter having a predetermined thickness and being adapted to locate in said conic strainer basket above said main shaft;

said rotary cutter being formed at central potion with a recess in which an axially extended threaded hole is provided for a fastening means to extend therethrough to fasten said rotary cutter to said main shaft in said conic strainer basket, whereby said rotary cutter rotates along with said main shaft when said operating motor is started, and said rotary cutter being provided on an upper surface at an inner area with a plurality of first cutter blades and around an outer peripheral area with a first annular grinding zone having a predetermined width; and said stationary cutter being a round member having a smaller thickness compared with said rotary cutter, said stationary cutter being formed of an eccentric connecting hole corresponding to said feed tube downward extended from said top cover, said stationary cutter being connected to the lower end of said feed tube of said top cover by engaging said eccentric hole with the lower end of said feed tube, and said stationary cutter being provided on a lower surface at an inner area with a plurality of second cutter blades and around an outer peripheral area with a second annular grinding zone having a predetermined width.

\* \* \* \* \*